United States Patent Office 2,781,831
Patented Feb. 19, 1957

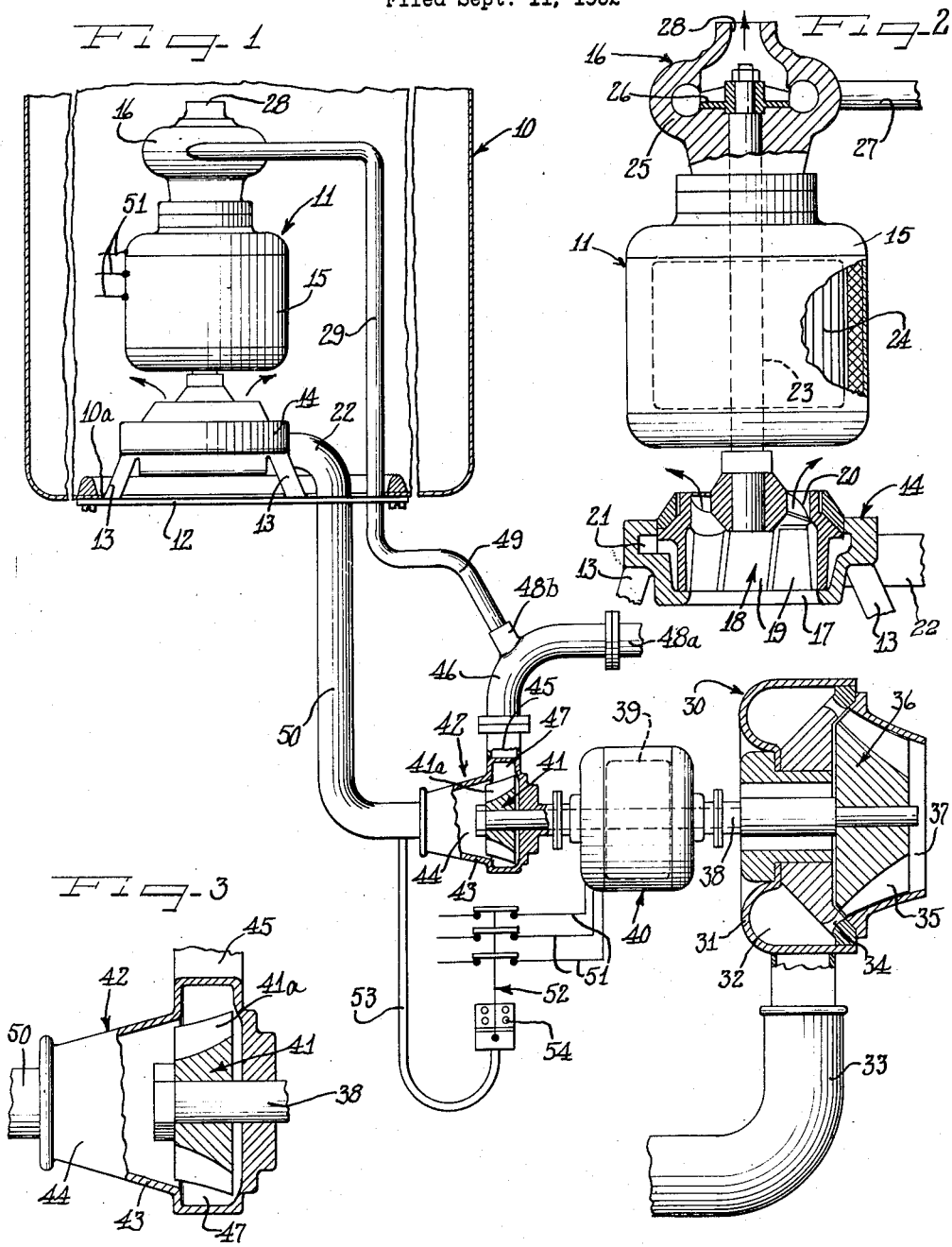

2,781,831

PUMPING ASSEMBLY

Pierce T. Angell, Euclid, Ohio, assignor to Thompson Products, Inc., a corporation of Ohio Application September 11, 1952, Serial No. 309,127

9 Claims. (Cl. 158—36.3)

This invention relates to a pumping system wherein a main pump receives fluid from a booster pump which is selectively driven by discharge pressure from the main pump or by electrical energy generated in the driving of the main pump. Specifically, this invention relates to a system for supplying both electrical current and vapor-freed fuel to an aircraft.

While the invention will hereinafter be specifically described as embodied in a jet-propelled aircraft, it should be understood that the principles of this invention are generally applicable to pumping systems embodying main pumps and booster pumps.

In accordance with this invention a booster pump unit including a vapor separating pump, an electric motor, and a hydraulic motor, is mounted in a fuel cell of a jet-propelled aircraft. A main pump unit for supplying fuel to the aircraft engine is mounted in the most desirable location on the aircraft without limitation because of the location of the booster pump unit. This main fuel pump has its inlet in communication with the outlet of the booster pump and has its outlet in communication with the hydraulic motor of the booster pump unit. An air turbine energized either directly from the ambient air surrounding the aircraft or from any source of air such as a compressed air tank, drives the main pump as well as an electric current generator. The electric current generator supplies electrical energy for driving the motor of the booster pump unit. A pressure sensitive electric switch controlled by discharge pressure of the booster pump selectively cuts off the current supply to the booster pump motor when the discharge pressure of the booster pump reaches a predetermined value. When this value is reached the inlet pressure at the main pump is sufficient so that the discharge pressure of this main pump will be great enough to not only supply the fuel intake of the aircraft engine but to also drive the hydraulic motor and thereby operate the booster pump. The generator is also useful to supply electric current for any other aircraft usage. It is preferred that this generator be an alternator type of any desired cycle such as 400–500 cycles. It is also preferred that the booster pump motor be an induction motor.

It is then an object of this invention to provide a pumping system having a main pump and a booster pump to maintain a desired inlet pressure in the main pump wherein the booster pump is driven from an external power source until inlet pressure in the main pump reaches a predetermined value whereupon the continued booster pump pressure is maintained by power supplied from the discharge of the main pump.

A further object of this invention is to provide a combined pumping and electric power generating system for an aircraft wherein a gas turbine drives a generator and a main pump and wherein a booster pump unit is selectively driven by power generated from either the generator or the main pump to maintain a desired inlet pressure in the main pump.

Another object of this invention is to provide a jet engine aircraft fuel system with a main fuel pump and a vapor separating booster pump wherein ambient air surrounding the aircraft drives the main fuel pump and the main fuel pump in turn supplies hydraulic power to drive the vapor separating booster pump so that the booster pump and the main pump can be located where desired on the aircraft.

A still further object of the invention is to provide an aircraft fuel system with an air driven turbine that drives both an electric generator and a main fuel pump and wherein the generator and main fuel pump selectively drives a vapor separating booster pump which maintains a desired head pressure of vapor-freed fuel at the inlet of the main fuel pump.

Other and further objects of this invention will be apparent to those skilled in the art from the following detailed description of the annexed sheet of drawings, which, by way of a preferred example only illustrates one embodiment of the invention.

On the drawings:

Figure 1 is a somewhat diagrammatic view of the pumping system of this invention.

Figure 2 is an enlarged fragmentary cross-sectional view of the booster pump used in the assembly of this invention.

Figure 3 is an enlarged cross-sectional fragmentary view of the main pump used in the assembly of this invention.

As shown on the drawings:

In Figure 1 the reference numeral 10 designates a fuel cell or tank of an airplane which may be located as desired in the plane. The cell 10 has an apertured bottom wall 10a supporting a booster pump unit 11 inside of the cell. The unit 11 has a base plate 12 spanning the aperture in the bottom wall 10a and carrying the unit 11 on legs 13. The legs 13 support a vapor separating booster pump casing 14. The casing 14 in turn supports an induction electric motor 15 and a hydraulic motor 16 is mounted on top of the electric motor 15.

The booster pump 14 has a bottom inlet 17 receiving fuel from the cell 10. A vapor separating impeller 18 is mounted in the pump casing 14 and includes a ring of pumping vanes 19 depending from an axial flow-inducing screw vane 20 in the upper end of the casing. The pumping vanes 19 discharge liquid fuel from the inlet 17 into a volute chamber 21 surrounding the ring of vanes and having a discharge nipple 22 extending to the base plate 12. Vapors separated in the center of the impeller are caused to flow out of the open top of the casing 14 by the screw vane 20 and are discharged back to the fuel cell out of the open top of the casing as indicated by the arrows. Therefore, only fully liquid fuel is delivered through the nipple 22.

The induction electric motor 15 has a through shaft 23 on which the impeller 18 is mounted. A core 24 is also mounted on the shaft 23 in the motor. The hydraulic motor 16 on top of the electric motor 15 includes a casing 25 with a turbine wheel 26 therein. The wheel 26 is mounted on the shaft 23. The motor 16 has a peripheral inlet 27 and a central top outlet 28. The inlet is connected with a nipple or tube 29 carried by the base plate 12. The outlet 28 discharges into the fuel cell.

The unit 11, thus includes a booster pump, an induction electric motor, and a hydraulic turbine or motor in superimposed relation and each having the rotatable elements thereof mounted on a common shaft. The entire unit is submerged in liquid fuel in the cell 10 and it has two nipple connections for tube or pipe mountings outside of the fuel cell.

An air turbine 30 is mounted on the aircraft at any convenient location without limitation with respect to the position of the cell 10. The air turbine 30 has a casing 31 providing a generally toroidal inlet chamber 32 receiving air from an air inlet 33 and discharging air through nozzles 34 against the vanes 35 of a turbine wheel 36 also mounted in the casing. The nozzles 34 direct the air against the vanes 35 to rotate the wheel 36. The wheel 36 converges from the nozzles 34 to a central outlet 37 opening downstream to facilitate removal of the air from the turbine wheel.

The turbine wheel 36 is mounted on a shaft 38 which is coupled with the rotor 39 of an alternator 40. The alternator rotor in turn is coupled with the rotor 41 of a main fuel pump 42. The pump 42 has a casing 43 with a central inlet 44 and a peripheral outlet 45. The rotor 41 has vanes 41a receiving fuel from the inlet 44 and centrifugally discharging the fluid into a volute 47 surrounding the rotor. The volute in turn discharges through the peripheral outlet 45.

The outlet 45 is coupled to a nipple 46 having its main outlet 48a adapted to be connected to the fuel intake of the aircraft engine (not shown) and having a smaller and secondary outlet 48b connected to a tube or pipe 49 which is joined with the inlet nipple 29 of the unit 11. The outlet 45 of the main fuel pump 42 is thus in communication with the inlet of the hydraulic motor or turbine 16.

The main pump inlet 44 is connected through a tube or pipe 50 with the discharge nipple 22 of the booster pump 14. Thus the pump 14 discharges into the inlet of the main pump 42.

The alternator 40 is connected electrically as through wires 51 with the induction motor 15 to energize the motor and drive the pump 14. A pressure sensitive switch 52 vented to the tube or pipe 50 as at 53 selectively controls energization of the motor 15 by the alternator. When pressure in the tube 50 reaches a predetermined value the switch 52 is opened to de-energize the motor 15. When pressure in the tube 50 drops below the predetermined value the switch 52 is closed by the bias of the spring 54 for example to again cause energization of the motor by the alternator. The value of pressure necessary to open the switch 52 is predetermined by the amount of head pressure required by the main fuel pump 42 to maintain an outlet pressure in the nipple 46 sufficient to drive the hydraulic motor 16 at the proper speed since the purpose of the system is to supply sufficient vapor freed fluid at the desired pressure to the fuel intake of the aircraft engine. The booster pump 14 must not only free all of the gases and vapors from the fuel before the fuel is pressurized and confined in a tube or pipe, but to also maintain enough head pressure on the main fuel pump 42 so as to preserve efficient pumping conditions in the pump 42, it is necessary that the booster pump be operated even before the main fuel pump develops enough pressure to drive the hydraulic motor. During this period of operation, the booster pump is driven by the alternator.

Sequence of operation

In operating the system of this invention, the air turbine 30 is started by venting its inlet 33 to a source of driving air, such as by opening the inlet to the upstream side of the ambient air surrounding the aircraft in flight, or by supplying the air from any other suitable source such as a compressed air tank. The air drives the turbine rotor 36 at high speed to drive the alternator 40 and the main fuel pump 42. The alternator 40 generates current. A suitable alternator for an aircraft system will generate 400–500-cycle current and will have a capacity of from 100–200 watts, but it should be understood that the type and capacity of the alternator may be varied to suit the particular requirements of the particular aircraft without departing from the scope of this invention. If desired, a direct current generator can be used in place of an alternator.

At the start of the operation, since the pressure in the tube 50 will be low, the switch 52 will be closed and the alternator will energize the induction motor 15 to drive the booster pump 14. The booster pump will thereupon supply fuel from the cell 10 to prime the main fuel pump 42. Since the main fuel pump 42 is also driven by the air turbine 30, and since it is designed to discharge at higher pressures than the booster pump when it is properly primed and has the proper head pressure, a partial bleed of the discharge from this high pressure main pump is then used to drive the hydraulic motor 16 for supplying the power to maintain operation of the booster pump. The energization of the electric motor 15 by the alternator 40 is stopped as soon as the bleed from the high pressure pump is sufficient to bring the booster pump up to normal speed and maintain the desired inlet pressure in the main pump. The booster pump then continues to operate from the driving power of the hydraulic motor alone. The main fuel feed to the engine is thus maintained by utilizing a partial bleed off of the fuel.

As the aircraft climbs to higher altitudes, fuel in the cells 10 tends to vaporize and the main fuel pump 42 would then become gas bound unless the booster pump in the fuel cell effectively separates the gases and vapors from the liquid before the liquid is fed to the main pump. This separation occurs in the fuel cell before the fuel is pressurized or confined in any fuel pipe. The recirculated fuel from the hydraulic motor bleed-back to the fuel tank is thereby degasified before it is returned to the tank and contributes to the maintenance of stable liquid conditions in the tank.

It should be understood that the alternator or electric current generator will supply electric current for general aircraft usage, in addition to the current used for the energization of the electric motor.

It will also be understood that a plurality of booster pump units can be driven from a single high pressure main pump and from a single alternator. Thus, each fuel cell of the aircraft can be equipped with a booster pump unit while the main fuel pump can be located wherever desired in the aircraft for receiving fuel selectively or simultaneously from the different booster pumps in the separated fuel cells.

While the hydraulic motor is illustrated as a turbine, it can be any suitable type of hydraulic actuator, such as a radial plunger pump, a gear pump, or the like. Likewise, the main fuel pump can take the form of any type of pump, although a by-pass should be provided to insure flow to the engine even in the event of failure of the main pump. When a centrifugal pump is used in tandem with the illustrated type of vapor separating pump, flow to the engine will be maintained even though either one of the pumps is inoperative because these pumps have their inlets and outlets always in flow communication.

From the above description, it should, therefore, be understood that this invention provides a pumping and electric current generating assembly especially adapted for actuation by an air turbine in an aircraft.

I claim as my invention:

1. A pumping and electric power generating system adapted for jet propelled aircraft and the like which comprises in combination a first unit having an air turbine, an alternator, and a first pump, all connected for corotation, a hydraulic motor, an electric motor, and a booster pump, all connected for corotation, said first pump having an inlet in communication with the outlet of said booster pump and an outlet to deliver fluid at increased pressure, means providing a passage communicating fluid from said outlet to the inlet of the hydraulic motor to drive said motor, circuit means including a pressure sensitive electric switch controlled in response to variations in discharge pressure from the booster pump, connecting the alternator and the electric motor, whereby the alternator driven by the turbine energizes the electric motor to drive the booster pump until the booster pump discharge pressure reaches a predetermined pressure whereupon discharge from the first mentioned pump will drive the hydraulic motor to drive the booster pump.

2. A combined pumping and electric power generating system which comprises a booster pump providing an inlet and a main pump providing an outlet and being in series flow relation with said booster pump, a turbine driving said main pump, an electric current generator driven by said turbine, an electric motor driving said booster pump, a hydraulic motor connected to the booster pump, means providing a passage communicating the hydraulic motor with the discharge of said main pump for driving the motor to operate the booster pump when the discharge pressure of the booster pump reaches a predetermined pressure, and an electric circuit operatively connecting the electric motor and the generator to energize the motor for driving the booster pump when said discharge pressure of the main pump is not sufficient to drive the hydraulic motor for operating the booster pump.

3. A fuel system for aircraft and the like which comprises a tank, a booster pump unit mounted in said tank, said unit including a vapor separating booster pump, an electric motor, and a hydraulic motor, said motors being coupled to said pump for driving the pump, a main fuel pump receiving fuel from the booster pump and having an outlet to the aircraft propulsion means, a turbine for driving said main fuel pump, an electric current generator driven by said turbine, means selectively energizing said electric motor for the booster pump from said generator when the booster pump pressure is below a predetermined value, and a bleeder tube connecting the discharge side of said main fuel pump with the inlet of said hydraulic motor to drive the booster pump when the main fuel pump produces a sufficient discharge pressure to maintain operation of the booster pump.

4. A fuel system for an aircraft engine which comprises a vapor separating booster pump, a main fuel pump in series flow relation with said booster pump and having an outlet to the engine, a hydraulic motor for driving said booster pump, an electric motor for driving said booster pump, an air turbine for driving said main fuel pump, an electric current generator driven by said air turbine, a bleed line connecting the discharge side of the main fuel pump with the hydraulic motor for supplying fuel from the main fuel pump under pressure to the hydraulic motor to drive the booster pump, and an electric circuit selectively connecting the generator with the electric motor for driving the booster pump from the electric motor.

5. A fuel system for an aircraft which comprises a vapor separating fuel pump, a main fuel pump in series flow relation therewith and having an outlet to the aircraft propulsion means, a hydraulic motor for driving the booster pump, an electric motor for driving the booster pump, means for driving the main fuel pump, an electric current generator driven by said means, and a bleed line connecting the discharge side of the main fuel pump with the hydraulic motor to drive the booster pump from the hydraulic motor.

6. A fuel system for an aircraft or the like which comprises a fuel cell, a vapor separating booster pump submerged in said cell, an electric motor driving said booster pump, a hydraulic motor driving said booster pump, a main fuel pump in series flow relation with the booster pump and having an outlet for the aircraft propulsion means, a bleed line connecting the discharge side of the main fuel pump with the hydraulic motor to energize the motor for driving the booster pump, an air turbine driving said main fuel pump, an electric current generator driven by said air turbine, and an electric circuit selectively energizing the electric motor to drive the booster pump by current supplied from the generator whenever the booster pump pressure is below a predetermined value.

7. An aircraft fuel system comprising, in combination, conduit connections providing a fluid circuit, a fuel cell at one point in said circuit providing a fuel reservoir for the circuit, a booster pump in said fuel cell having a vapor separating impeller to drive a stream of substantially liquid fuel through said circuit at increased pressure, a main fuel pump at a second point in said circuit and receiving liquid fuel from said booster pump and driving a stream of fuel at additionally increased pressure through said circuit including at least a portion of said stream of fuel back to said fuel cell, means providing an outlet from said circuit downstream of said main fuel pump to carry pressurized liquid fuel to the aircraft propulsion means, a fluid motor in said fuel cell connected to said booster pump for rotation with said vapor separating impeller and having means receiving fuel from said main fuel pump to drive said impeller, an electric motor connected to said booster pump for rotation with said vapor separating impeller, and circuit means for selectively energizing said electric motor including control means responsive to variations in pressure in said fluid circuit between said first and second points to deenergize said electric motor selectively.

8. In combination, series interconnected first and second fluid pumps, means providing an inlet for said first pump and an outlet for said second pump, said first pump having electrical drive means and fluid motor drive means connected thereto for rotation therewith, said second pump having independent drive means connected thereto for rotation therewith, current generating means connected to said second pump for rotation therewith, conduit means interconnecting said outlet and said fluid motor drive means to drive said fluid motor drive means, circuit means interconnecting said current generating means and said electrical drive means to energize said electrical drive means whenever said independent driving means are operated, and including control means responsive to variations from a predetermined fluid reference pressure between said first and second pumps to selectively deenergize said electrical drive means.

9. A pumping system comprising, a booster pump for initially pressurizing a stream of fluid, a first motor having a driving connection with said booster pump, a main pump receiving said stream of fluid from said booster pump and driving said stream of fluid at additionally increased pressure, a fluid motor having a driving connection with said booster pump and receiving fluid from said main pump to drive said fluid motor, means to drive said main pump, and pressure-responsive control means for inactivating said first motor only when the discharge pressure of said booster pump attains a predetermined value, whereby said booster pump is driven by said fluid motor alone only when the discharge of the main pump is sufficient to supply the normal point of utilization of the stream of fluid and the fluid motor.

References Cited in the file of this patent

UNITED STATES PATENTS

| | | |
|---|---|---|
| 2,238,502 | Muir et al. | Apr. 15, 1941 |
| 2,363,528 | Hulman et al. | Nov. 28, 1944 |
| 2,383,650 | Hess | Aug. 28, 1945 |
| 2,395,657 | Dinsmore et al. | Feb. 26, 1946 |
| 2,398,106 | McCollum | Apr. 9, 1946 |
| 2,418,720 | McCollum | Apr. 8, 1947 |
| 2,592,938 | McNaught | Apr. 15, 1952 |
| 2,609,659 | Price | Sept. 9, 1952 |
| 2,610,464 | Knoll | Sept. 16, 1952 |
| 2,630,069 | Harris | Mar. 3, 1953 |